United States Patent [19]
Ou

[11] Patent Number: 5,297,715
[45] Date of Patent: Mar. 29, 1994

[54] MACHINE FOR MAKING STEEL GRIDS

[76] Inventor: Sim-Mu Ou, No. 122, Pei Ping Rd., Feng Shan, Kaohsiung Hsien, Taiwan

[21] Appl. No.: 995,194

[22] Filed: Dec. 22, 1992

[51] Int. Cl.$^5$ .............................................. B23K 11/00
[52] U.S. Cl. ..................................... 228/4.1; 228/6.1; 228/44.3; 219/56
[58] Field of Search ................. 228/4.1, 5.1, 6.1, 44.3, 228/49.1; 219/56, 58, 78.01, 78.02, 79

[56] References Cited

U.S. PATENT DOCUMENTS

| | | | |
|---|---|---|---|
| 3,370,150 | 2/1968 | Nordgren | 219/56 |
| 3,405,743 | 10/1968 | Robinson | 219/56 |
| 3,488,841 | 1/1970 | Stern | 219/56 |
| 3,588,417 | 6/1971 | Gött et al. | 219/56 |
| 4,068,110 | 1/1978 | Larsson | 219/56 |
| 4,468,550 | 8/1984 | Gött et al. | 228/4.1 |
| 4,748,309 | 5/1988 | Ritter et al. | 219/56 |
| 4,853,511 | 8/1989 | Ritter et al. | 219/56 |
| 5,013,879 | 5/1991 | Lind | 219/56 |

FOREIGN PATENT DOCUMENTS 211226  7/1984  Fed. Rep. of Germany ....... 228/6.1

Primary Examiner—Samuel M. Heinrich
Attorney, Agent, or Firm—Daniel H. Kane

[57] ABSTRACT

A machine for making steel grids each consisting of a number of steel strips attached to a number of steel rods at an angle of 90°. The steel strips are formed with temporarily softened spots by means of the machine. The steel rods are pushed into the temporarily softened spots by means of the machine.

1 Claim, 4 Drawing Sheets

MACHINE FOR MAKING STEEL GRIDS

BACKGROUND OF THE INVENTION

Field of Invention

The present invention relates to steel grids and, more particularly, to a machine for making such steel grids.

Related Prior Art

Generally, steel grids each consist of a number of steel strips and a number of steel rods. A number of cutouts are punched in each steel strip. The steel rods are disposed in the cutouts. A number of weld points are formed at points wherein the steel strips engage with the steel rods so that the steel strips are joined together with the steel rods. However, it is not economic to make steel grids this way, as only one cutout can be punched each time, and as only one weld point can be formed each time.

It is an object of the present invention to provide a machine for making steel grids each consisting of a number of steel strips attached to a number of steel rods.

It is another object of the present invention to provide a machine on which a number of steel strips are conveyed along a table and a number of steel rods are provided on the steel strips one after another.

For a better understanding of the present invention and objects thereof, a study of the detailed description of the embodiments described hereinafter should be made in relation to the accompanying drawings.

DETAILED DESCRIPTION OF PREFERRED EMBODIMENT

A machine for making steel grids in accordance with a preferred embodiment of the present invention will be described in details with reference to FIGS. 1-6.

Figure 1:
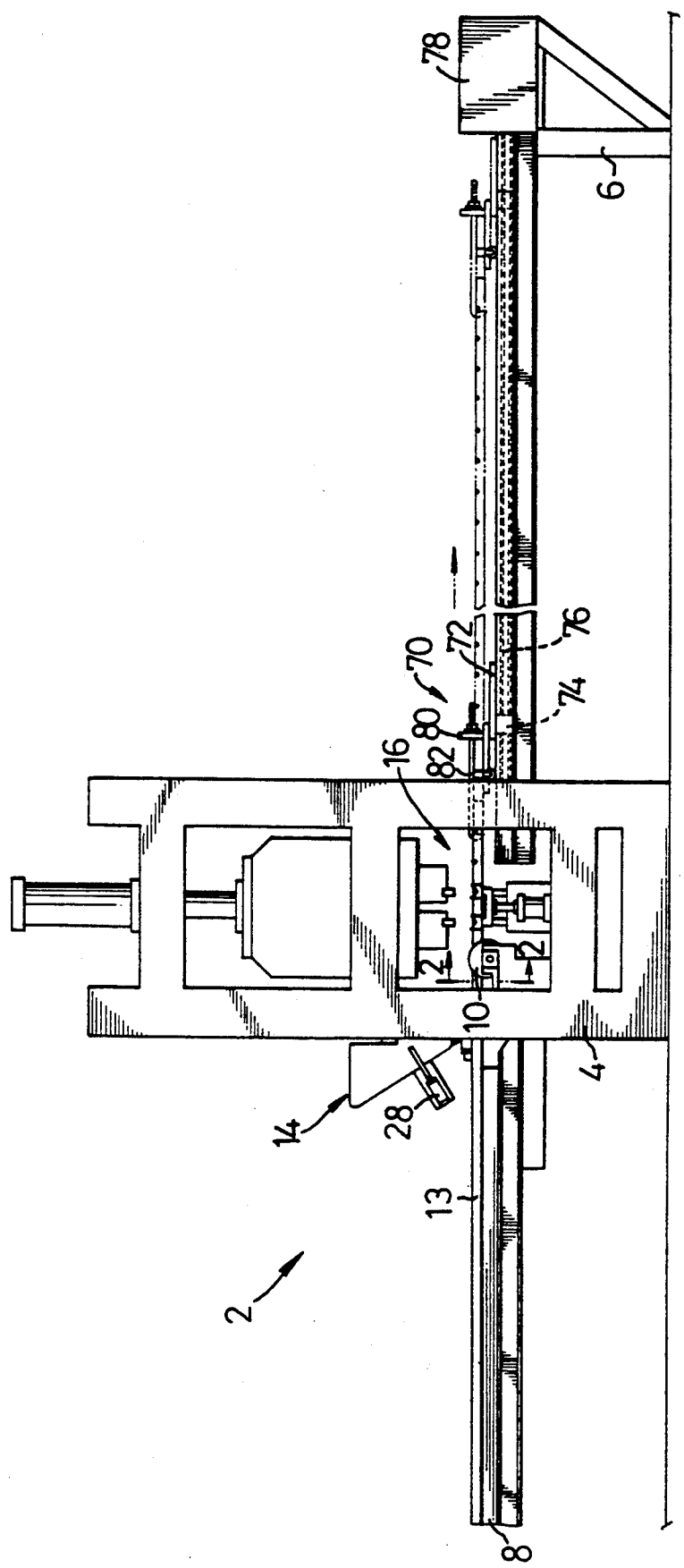
FIG. 1 is a right view of a machine for making steel grids in accordance with a preferred embodiment of the present invention.

Initially referring to FIG. 1, a machine 2 for making steel grids has first and second frames 4 and 6 vertically installed on the ground for supporting a table 8.

Figure 2:
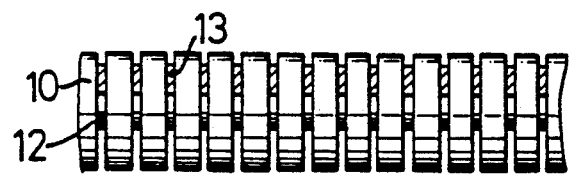
FIG. 2 is a cross-sectional view taken along line 2—2 in FIG. 1, showing a number of steel strips provided on a table of a machine for making steel grids in accordance with a preferred embodiment of the present invention.

Additionally referring to FIG. 2, a number of rollers 10 are mounted on a common shaft 12 horizontally mounted on the table 8, near the first frame 4. Each pair of adjacent rollers receives one of a number of steel strips 13. A distance between each pair of adjacent rollers 10 is identical to a width of each steel strip, so that the rollers 10 retain the steel strips 13 in position for further processing, i.e., the heights of the steel strips 13 are retained vertically. In accordance with the preferred embodiment, the steel strips 13 are manually mounted on the table 8. Alternatively, automatic means can be used for loading the steel strips 13 on the table 8. However, as this is not the spirit of the present invention, no further description thereof will be given. As shown in FIGS. 1, 3, 4, 5 and 6, the vertically oriented flat elongate metal strips 13 are formed with straight continuous upper edges without cutouts or indentations.

Further referring to FIG. 1, a device 14 and a station 16 are mounted on the first frame 4 respectively for feeding steel rods on the steel strips 13 and for welding the steel rods on the steel strips 13. The device 14 is on the upstream position to the station 16. When the steel strips 13 are initially loaded on the table 8, the leading ends of the steel strips 13 should be disposed below the station 16.

Figure 3:
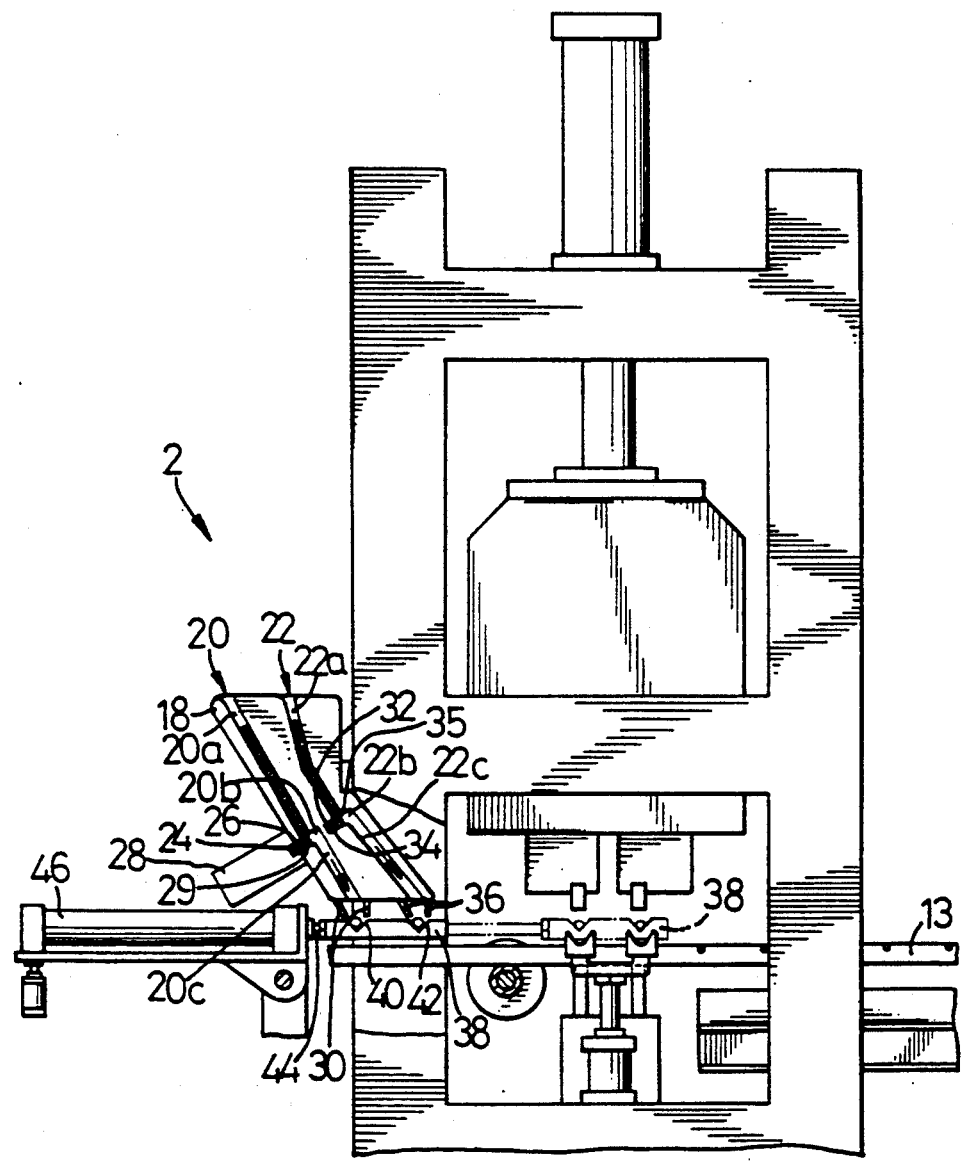
FIG. 3 is an enlarged partial right view of a machine for making steel grids, showing a device for feeding steel rods onto steel strips at a station for welding the steel rods onto the steel strips, in accordance with a preferred embodiment of the present invention.

Additionally referring to FIG. 3, the device 14 and the station 16 are illustrated in an enlarged view. The device 14 has two symmetrical storing/guiding plates 18 (only one is shown for convenience) vertically mounted on the first frame 4.

Each of the plates 18 has two channels 20 and 22 formed therein for receiving the tips of steel rods. The channel 20 consists of a substantially vertical upper subchannel 20a, a substantially horizontal middle subchannel 20b and a substantially vertical lower subchannel 20c. The upper subchannel 20a has an upper end functioning as an inlet for receiving the tips of the steel rods and a lower end. The middle subchannel 20b has a front end and a rear end. The lower end of the upper subchannel 20a communicates with the front end of the middle subchannel 20b. The lower subchannel 20c has an upper end and a lower end. The rear end of the middle subchannel 20b communicates with the upper end of the lower subchannel 20c. The lower end of the lower subchannel 20c functions as an outlet for discharging steel rods. The front end of the middle subchannel 20b is slightly lower than the rear end of the middle subchannel 20b, for restraining the steel rods stored in the upper subchannel 20a from accidentally moving to the rear end of the middle subchannel 20b and falling along the lower subchannel 20c.

The middle subchannel 20b communicates with a slot 24 at the front end thereof. A finger 26 operatively connecting with a hydraulic cylinder 28 protrudes through the slot 24. Initially, the finger 26 is disposed against the lowest steel rod 29 stored in the upper subchannel 20a. The finger 26 can be driven by means of the hydraulic cylinder 28 so as to push the lowest steel rod 29 from the front end to the rear end of the middle subchannel 20b, so that the lowest steel rod 29 can fall along the lower subchannel 20c. Two slim guides 30 are formed below the storing/guiding plate 18 for guiding the lowest steel rod 29.

The channel 22 consists of a substantially vertical upper subchannel 22a, a substantially horizontal middle subchannel 22b and a substantially vertical lower subchannel 22c. The upper subchannel 22a has an upper end functioning as an inlet for receiving the tips of the steel rods and a lower end. The middle subchannel 22b has a front end and a rear end. The lower end of the upper subchannel 22a communicates with the front end of the middle subchannel 22b. The lower subchannel 22c has an upper end and a lower end. The rear end of the middle subchannel 22b communicates with the upper end of the lower subchannel 22c. The lower end of the lower subchannel 22c functions as an outlet for discharging steel rods. The front end of the middle subchannel 22b is slightly lower than the rear end of the middle subchannel 22b, for restraining the steel rods stored in the upper subchannel 22a from accidentally moving to the rear end of the middle subchannel 22b and falling along the lower subchannel 22c.

The middle subchannel 22b communicates with a slot 32 at the front end thereof. A finger 34 operatively connecting with a hydraulic cylinder 28 protrudes through the slot 32. Initially, the finger 34 is disposed against the lowest steel rod 35 stored in the upper subchannel 22a. The finger 34 can be driven by means of the hydraulic cylinder 28 so as to push the lowest steel rod 35 from the front end to the rear end of the middle subchannel 22b, so that the lowest steel rod 35 can fall along the lower subchannel 22c. Two slim guides 36 are formed below the storing/guiding plate 18 for guiding the lowest steel rod 35.

The configuration and function of the channel 20, the slot 24, the finger 26 and the slim guides 30 are similar to those of the channel 22, the slot 32, the finger 34 and the slim guides 36. Obviously, each of the storing/guiding plate 18 can use one channel as well as more than two channels. That is, a desired number of steel rods can be fed onto the steel strips 13 at the same time.

The device 14 further has two feeding bars 38 (only one is shown for convenience). Each of the feeding bars 38 has two notches 40 and 42 respectively for receiving the steel rods 29 and 35 from the pairs of the slim guides 30 and 36. Corresponding to at least one channel defined in the storing/guiding plate 18, the feeding bar 38 can have one or more than two notches.

The feeding bars 38 are operatively linked to two rams 44 (only one is shown for convenience) co-axially extending from two hydraulic cylinders 46 (only one is shown for convenience). Thus, the feeding bar 38 has a first position relative to the hydraulic cylinder 46 when the ram 44 is retracted into the hydraulic cylinder 46 and a second position relative to the hydraulic cylinder 46 when the ram 44 is extended out of the hydraulic cylinder 46. In the first position as shown in bold lines, the feeding bar 38 is below the storing/feeding plate 18 with the notches 40 and 42 respectively aligning with the pairs of slim guides 30 and 36. Thus, the steel rods 29 and 35 directly fall into the notches 40 and 42 respectively from the slim guides 30 and 36. In the second position as shown in phantom lines, the feeding bar 38 is in the station 16.

Figure 4:
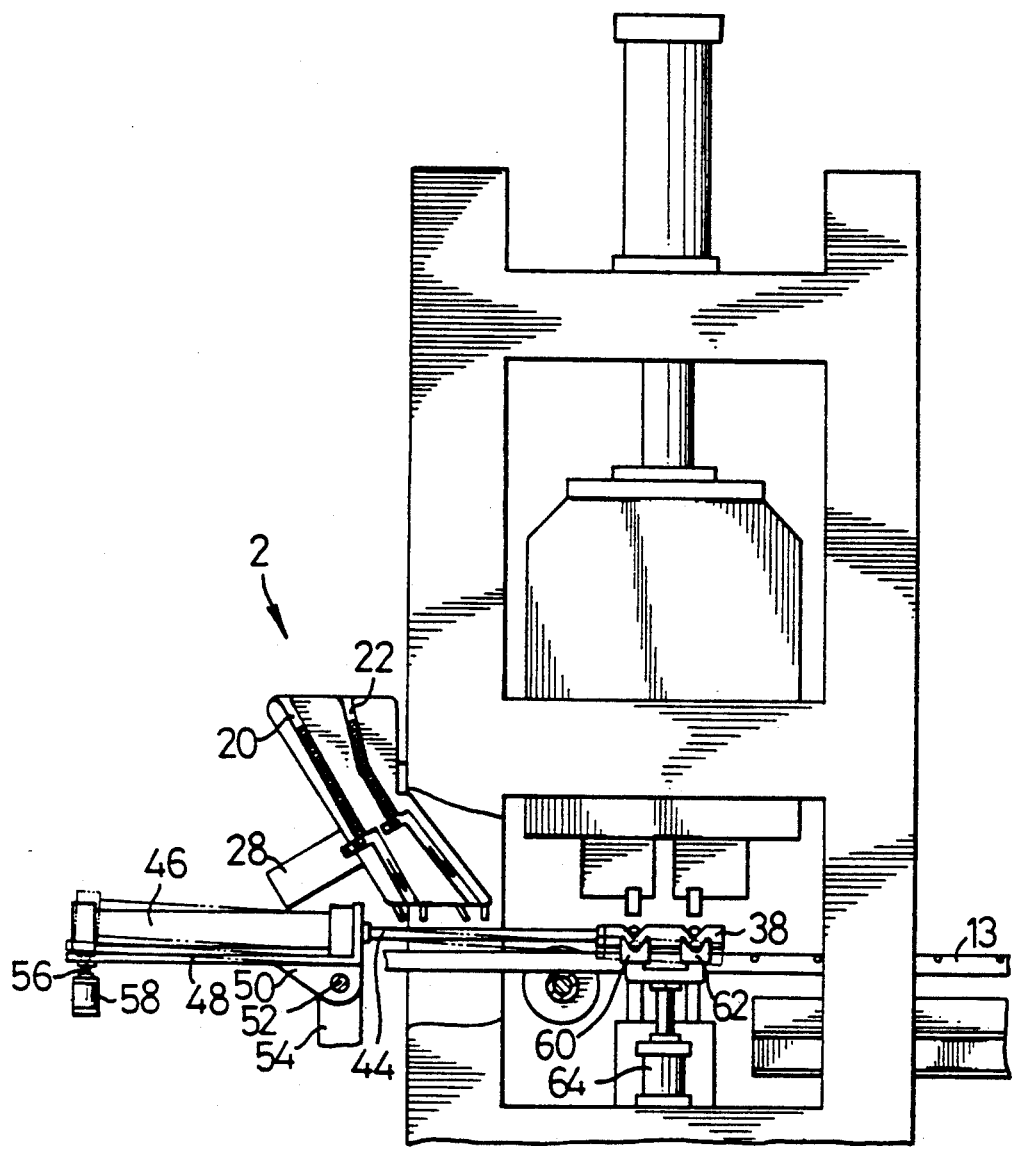
FIG. 4 is a view similar to FIG. 3, but two steel rods being transported to a position to be welded on a number of steel strips.

Additionally referring to FIG. 4, the feeding bar 38 is in the second position relative to the hydraulic cylinder 46 as shown in bold lines. The hydraulic cylinders 46 are securely mounted on two plates 48 (only one is shown for convenience) The lower surface of each of the plates 48 is formed with a lug 50 at a first end thereof. A pivot 52 is inserted through holes respectively defined in the lug 50 and a tab 54 projecting from the machine 2. Thus, the hydraulic cylinder 46 is pivotably mounted on the machine 2. The lower surfaces of the plates 48 are operatively linked to two rams 56 (only one is shown) co-axially extending from two hydraulic cylinders 58 (only one is shown) at second ends thereof.

Although not shown, the hydraulic cylinder 58 is pivotably linked to the machine 2. Thus, the hydraulic cylinder 46 has a first position relative to the machine 2 when the ram 56 is retracted in the hydraulic cylinder 58 and a second position relative to the machine 2 when the ram 56 is extended out of the hydraulic cylinder 58.

Two pairs of forks 60 and 62 (only one pair is shown for convenience) are securely linked to two hydraulic buffers 64 (only one is shown for convenience) securely mounted on the machine 2.

In operation, steel rods are manually fed into the slots 20 and 22. The hydraulic cylinders 28 drive the fingers 26 and 34 to push the steel rods 29 and 35 from the front ends to the rear ends of the subchannels 20b. Thus, the steel rods 29 and 35 are permitted to fall respectively along the subchannels 20c and 22c. Then, by means of the slim guides 30 and 36, the steel rods 29 and 35 are loaded into the notches 40 and 42. At this instant, the feeding bars 38 are in the first position relative to the hydraulic cylinders 46 and the hydraulic cylinders 46 are in the first position with respect to the machine 2. Then, the feeding bars 38 are moved to the second position relative to the hydraulic cylinders 46 while the hydraulic cylinders 46 are retained in the first position with respect to the machine 2. In this position, the feeding bars 38, together with the steel rods 29 and 35, are disposed above the forks 60 and 62. Then, the feeding bars 38 are maintained in the second position relative to the hydraulic cylinders 46 while the hydraulic cylinders 46 are moved to the second position with respect to the machine 2. Thus, the steel rods 29 and 35 are transferred onto the forks 60 and 62 when the feeding bars 38 are moved past and below the forks 60 and 62. Then, the feeding bars 38 are retained in the first position relative to the hydraulic cylinders 46 while the hydraulic cylinders 46 are moved to the first position with respect to the machine 2. Thus, the device 14 is ready for feeding two further steel rods onto the forks 60 and 62.

Figure 5:
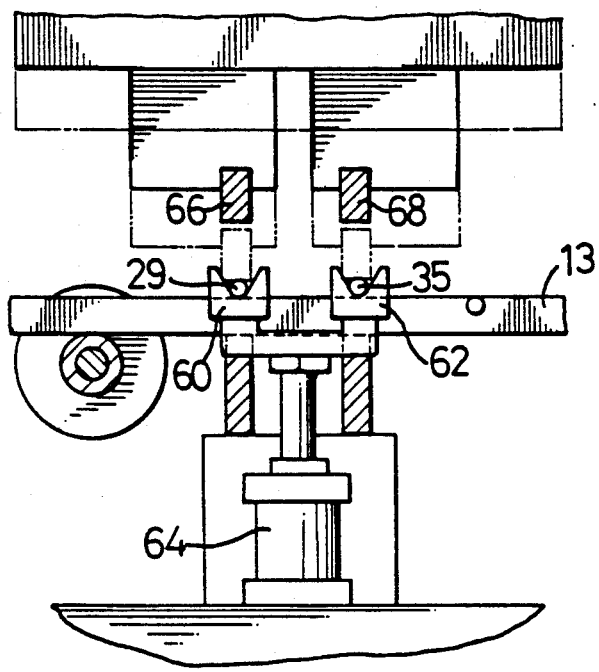
FIG. 5 is an enlarged partial right view of a machine for making steel grids, particularly showing a station for welding steel rods onto steel strips wherein two steel rods are to be welded on a number of steel strips, in accordance with a preferred embodiment of the present invention.

Referring to FIG. 5, the station 16 further comprises two bars 66 and 68. The bars 66 and 68 are slidably mounted on the frame 4. In a first position relative to the frame 4 as shown in bold lines, the bars 66 and 68 are retained above the steel rods 29 and 35. The steel rods 29 and 35 are above the steel strips 13 and the hydraulic buffer 64 is substantially not compressed. In a second position with respect to the frame 4 as shown in phantom lines, the bars 66 and 68 are moved downward so as to abut the steel rods 29 and 35. Accordingly, the steel rods 29 and 35 are pressed against the steel strips 13. The forks 60 and 62 ensure that the steel rods 29 and 35 are retained in right positions relative to the steel strips 13.

The bars 66 and 68 are electrically linked to a power supply (not shown). Obviously, the bars 66 and 68 must be made of conductive materials. The bars 66 and 68 induce a current through the steel rods 29 and 35. The steel rods 29 and 35 produce heat as the current flows therethrough, due to an electrical resistance. The heat produced by the steel rods 29 softens the regions of the steel strips 13 contacting the steel rods 29 and 35, so that the same can be welded together. Preferably, the bars 66 and 68 are made from copper or any material which has a higher melting point and a lower electrical resistance than the steel strips 13. Furthermore, the bars 66 and 68 should be made from materials wherein the steel rods cannot not be merged at the highest temperature which can be reached by the steel rods.

Figure 6:
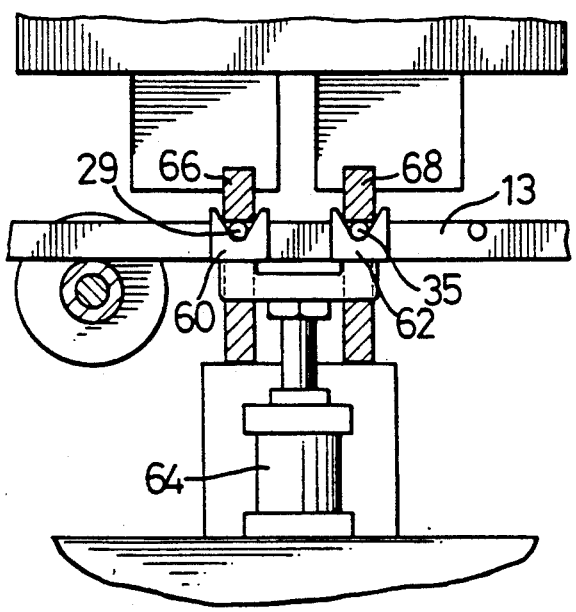
FIG. 6 is a view similar to FIG. 5, but with two steel rods being welded on a number of steel strips.

The regions of the steel strips 13 contacting the steel rods will be softened after being heated for a period, e.g., 2 seconds. The bars 66 and 68 are further moved downward to a third position relative to the frame 4, as shown in bold lines in FIG. 6. The steel rods 29 and 35 are pressed into the steel strips 13 by means of the bars 66 and 68. As shown in FIGS. 1, 3, and 4 and in particular as shown in FIGS. 5 and 6, the metal rods 29 and 35 are pressed into the steel strips 13 by means of the bars 66 and 68 to a depth substantially the diameter of the metal rods 29 and 25.

Further referring to FIG. 1, a device 70 for feeding the steel strips 13 has a pallet 72 slidably mounted on the table 8. The pallet 72 is formed, at its lower surface, with a threaded nut 74 engaging with a corresponding number of threaded bolts 76 rotatably mounted beneath the table 8. The threaded bolts 76 are operatively linked to a driving assembly 78 consisting of at least one gear assembly and one motor. The pallet 72 has a number of forks 80 formed at its lower surface.

After the steel rods 29 and 35 are securely attached to the steel strips 13, the bars 66 and 68 are retracted to the first position. A number of hooks 82 are used to link the steel rods 29 and 35 to the forks 80. Thus, the steel strips 13 are moved on and along the table 8 by means of the driving assembly 78. The driving assembly 78 will be disactivated once the steel strips 13 are moved for a predetermined distance, i.e., the distance between the steel rods 29 and 35 in the steel strips 13. Thus, two further steel rods can be securely attached to the steel strips 13. A control unit can be used to control the operation. However, the control unit will not be described with details as being well-known and not the spirit of the present invention.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A machine for making metal grids, comprising:

a table for bearing metal strips;

two plates mounted on two opposite sides of said table, each of said plates defining at least one channel for storing/loading steel rods, each of said channels comprising an upper subchannel comprising an upper end and a lower end, a middle subchannel comprising a front end and a rear end and a lower subchannel comprising an upper end and a lower end, said lower end of said upper subchannel communicating with said front end of said middle subchannel, said rear end of said middle subchannel communicating with said upper end of said lower subchannel, said front end of said middle subchannel retained on a higher level than said rear end of the same so that the steel rods are piled in said upper subchannel by means of said middle subchannel;

two fingers being slidable in said middle subchannels, for moving the lowest one of the steel rods throughout said middle subchannels so that the lowest steel rod falls throughout said lower subchannels onto the steel strips;

means for inducing a current through the metal rods for producing heat for softening the metal strips when the metal rods are disposed on the metal strips;

means for pressing the metal rods into the metal strips when the metal strips are softened; and means for feeding metal strips along said table.

* * * * *